Nov. 22, 1949 P. J. PACKMAN 2,488,983
POTATO HARVESTING MACHINE
Filed May 19, 1945 3 Sheets-Sheet 3

INVENTOR
P. J. Packman
By Watson, Cole, Grindle & Watson

Patented Nov. 22, 1949

2,488,983

UNITED STATES PATENT OFFICE 2,488,983

POTATO HARVESTING MACHINE

Percival James Packman, Twyford, England

Application May 19, 1945, Serial No. 594,650
In Great Britain May 19, 1944

27 Claims. (Cl. 55—9)

This invention consists in improvements in or relating to potato or root harvesting machines, and has for its object to provide a machine in which removal of haulms and riddling of the earth from the potatoes will be more efficiently carried out, and with less damage to the potatoes than hitherto.

For reasons of brevity hereinafter and in the appended claims all such roots will be referred to and will be included in the term "potatoes."

This invention is applied to that type of harvesting machine in which earth and potatoes are passed on to a rotary riddle, the axis of which is or may be inclined obliquely to the ground surface from which the potatoes are to be lifted. Earth and potatoes together are passed on to the riddle and are gradually moved over the surface thereof by rotating the riddle, and during this passage the earth escapes through the meshes of the riddle and the potatoes free or substantially free from earth are discharged from the riddle for subsequent handling.

According to the present invention a harvesting machine of this type has a riddle which is mounted to rotate about an axis that is inclined obliquely to the line of travel of the machine and the said axis itself is disposed in a vertical plane that lies obliquely across or is parallel to the aforesaid line of travel, and which is formed as a rotor having a central aperture, an outer marginal annular portion formed as a riddling surface free from pockets and an intermediate portion between the central apertures and the riddling surface is provided with pockets into which the potatoes can pass from the riddling surface and by which they will be elevated as the riddle rotates.

The inclination of the axis in the plane of reference, and the inclination of that plane itself across the line of travel, when it is not parallel to the line of travel, are inclinations at angles other than right angles relatively to that line. In the preferred form of the invention the axis and the plane of reference will both be so inclined.

The effect will be that earth and potatoes are received on a very slightly inclined or even on a substantially horizontal surface of the riddle and rotation of the riddle will be in a direction partially in agreement with the soil flow.

As the riddle is rotated and the potatoes are carried round with it the surface of the riddle virtually tilts gradually upwards more and more so that earth and potatoes are gently rolled and are automatically carried rearwardly of the machine and down over the surface of the riddle. This action is a gentle one and tends rapidly to remove earth from the potatoes largely at the position at which it is deposited on the riddle from the plough preceding it, and motion imparted to the potatoes is a gentle revolving motion towards the inner diameter of the riddle so that the potatoes cannot escape from the open inner end thereof until they have been carried substantially to the uppermost position in the riddle and have passed right across the riddling surface.

When the riddle, which is described as open at both ends, is of very shallow bowl or conical form, the two ends will of course be very close together considered axially and are virtually constituted by the outer and inner diameters of the riddle, the latter affording an open space in the region of the inner diameter through which potatoes can escape.

In order that the invention may be more clearly understood, a preferred construction will now be described by the aid of the accompanying drawings in which—

Figure 1:
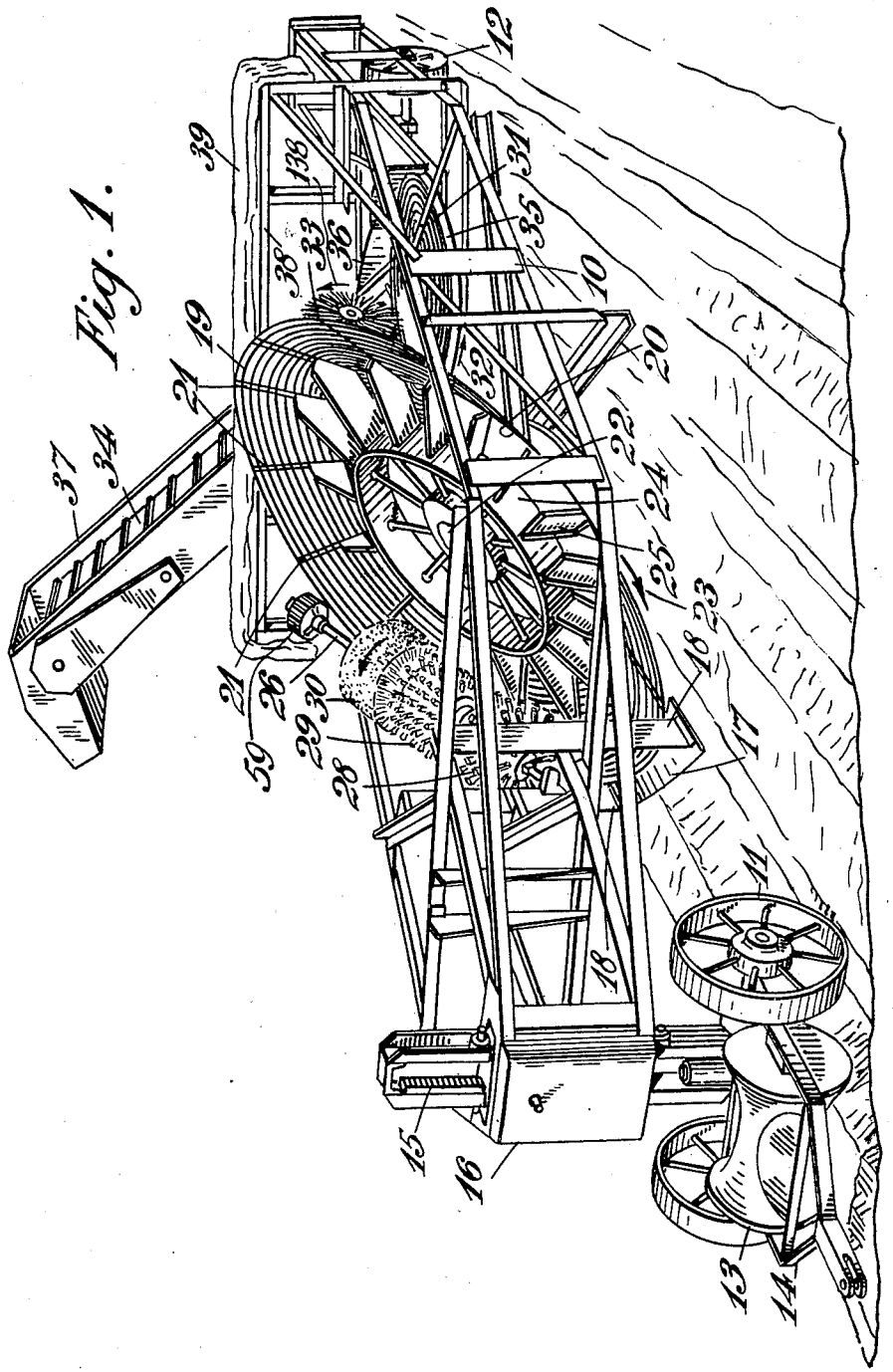
Figure 1 is perspective view showing the principal constructional features of the invention with the exception of a haulm remover.

As illustrated, particularly in Figure 1, the apparatus is mounted in an open framework carriage designated as a whole by reference numeral 10, this carriage being supported on front wheels 11 and rear wheels 12. Between the front wheels 11 is a profiled roller 13 which is shaped to travel on a potato ridge to crush surface lumps and help to guide the machine and a draw-bar 14 is mounted on the front axle and is intended to be attached to a tractor or other means by which the harvester is removed over the ground.

The front wheels are carried in a frame 15 and elevating mechanism enclosed in casing 16 enables the front of the main frame 10 to be raised and lowered whereby the height of the frame above the front wheels can be adjusted in order to adjust the depth at which the plough will operate. An adjustable stop (not shown) on the part 15 serves to locate the frame in its adjustable position. The elevating mechanism however, of itself forms no part of the present invention.

In rear of the front wheels 11 is a plough 17, the leading edge of which is straight or arcuate, this straight edge or the chord of the arc being inclined as shown obliquely with respect to the line of travel of the machine. The plough is fixed in the carriage on supports 18 and the curved edge not only digs into the ridge but, due to its inclination across the line of travel a shearing effect is obtained in cutting through the earth of the ridge. This shearing action greatly facilitates movement of the plough and reduces the power necessary to drive this portion of the machine as compared with a plough the edge of which is at right angles to the line of travel.

The main riddle 19 is in the form of a truncated cone, the smaller diameter of which, denoted by the reference numeral 20 affords an opening for the escape of potatoes. The riddle may be constructed in any preferred manner and is conveniently formed by concentric circular hoops spaced apart by and secured to members 21 which themselves are spaced uniformly around the axis of the riddle.

The riddle is mounted to rotate on a spindle 22 the axis of which is inclined obliquely in both respects as already described, and is tilted forwardly from its lower end considered in relation to the direction of travel. The riddle is rotated in the direction of arrow 23 and is furnished with a central cylindrical wall 24 and with spaced radial fins 25 which extend across the gap between the smaller diameter of the riddle 20 and the cylindrical wall 24 and also partially radially across the surface of the riddle.

Soil and potatoes passing from plough 17 on to the lowermost surface of the riddle flow on to the latter in a direction which conforms to some extent to the direction of movement of the riddle, this being caused by the inclination of the plough. By this direction of flow the movement of the riddle is considerably facilitated as compared with hitherto known machines in which the leading edge of the plough is at right angles to the line of travel and the axis of the riddle is parallel to that line. Moreover, by the use of an inclined plough it is found that a certain portion of weeds and haulms move to one side without entering the riddle.

The fins 25 constitute baffles or walls and divide the portions of the riddle over which they extend into a plurality of spaced pockets which assist in carrying the potatoes, and some earth round with the riddle and in an upward direction due to the rotation of the riddle.

Figure 2:
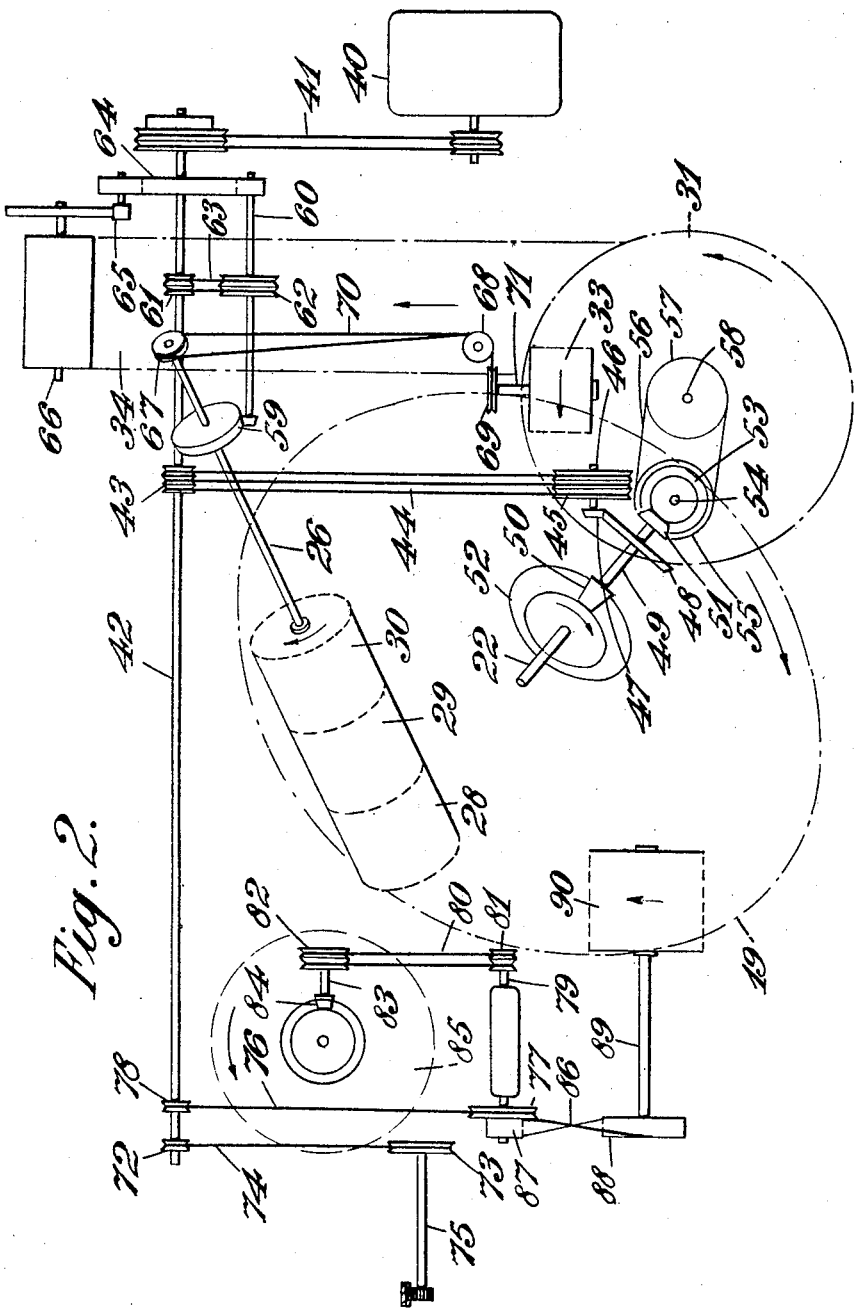
Figure 2 is a somewhat schematic layout of the several principal parts of the apparatus and the drive therefor shown as a plan view looking from above in Figure 1.
Figure 3:
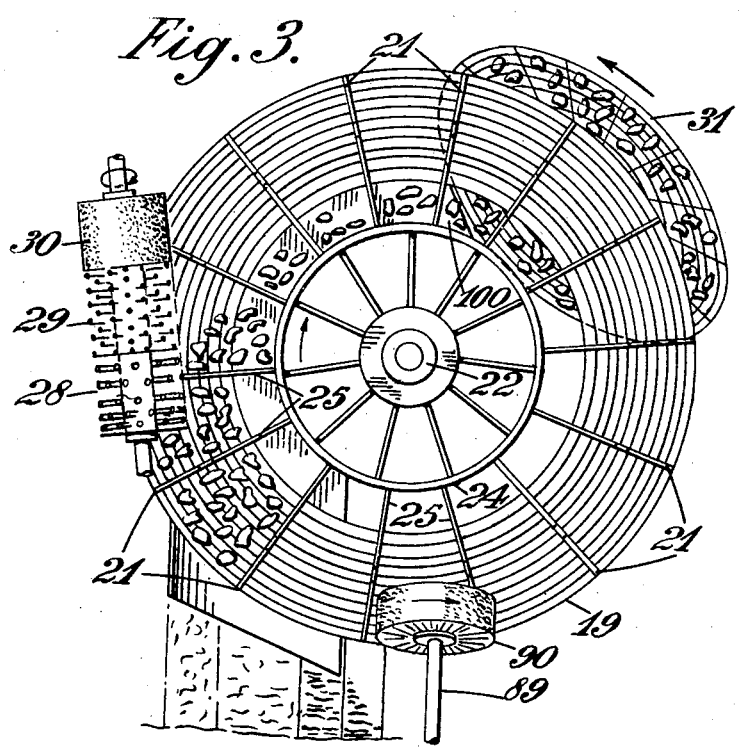
Figure 3 is a plan of the main riddle viewed from above along the line of its axis.

In Figure 3 is shown a shield 100 which for the sake of clearness is not shown either in Figure 1 or Figure 2. This shield underlies the gap between the inner diameter of riddle 19 and the cylindrical wall 24 from the region of the plough to the position at which it is desired that the potatoes shall drop on to riddle 31. This retains the potatoes in the pockets between fins 25 prior to their discharge from those pockets.

In order to prevent earth, particularly if it is damped, from piling up at a position just beyond that at which earth and potatoes are received by the riddle from the plough, power driven agitating means is provided situated close to the position at which the lifted material is deposited on the riddle. The agitator serves to stimulate the separation of earth from the potatoes and its passage through the riddle and conveniently comprises a power driven brush rotatably mounted on an axle 26. In the preferred form this brush is of cylindrical form and is in three sections, namely, section 28 in which the bristles are coarse, section 29 in which the bristles are finer, and section 30 in which they are finer still. The brush is arranged so that its axis is substantially tangential to the circle of the riddle and is inclined downwardly from the back towards the front of the machine so that it sweeps across the surface of the riddle. The direction of rotation of the brush is indicated by the arrow marked on section 30 from which it will be understood that earth and potatoes are swept towards the inner or smaller diameter of the riddle; and while by this means the earth is largely brushed through the meshes of the riddle the potatoes are at the same time moved inwardly into the pockets of one adjacent fin 25.

The brush effectively agitates and divides up the earth while at the same time separating it from the potatoes. In order to assist further in the screening and separation of the potatoes a second rotary riddle 31 is situated in the machine so as to receive potatoes discharged from the main riddle. The potatoes actually pass from the main riddle 19 at substantially the highest point reached by the gap between the riddle and the cylindrical wall 24 and the second riddle 31 is of such size and is so situated that the potatoes drop on to it. The second riddle rotates in a direction of arrow 32 about a substantially vertical axis and serves not only to complete the screening of the earth from the potatoes but also as a transporter for them and it will be seen that the direction of rotation of riddle 31 is such that it conforms to the direction of movement of the potatoes as they leave riddle 19 whereby their transference from one riddle to the other will be smoothly effected.

Riddle 31 is shown in this example as a flat disc composed of concentric annular hoops which may be spaced and supported similarly to those of riddle 19 but if preferred, riddle 31 may be of shallow, conical or bowl form. Associated with riddle 31 is another power driven brush 33 which sweeps across the riddle at the discharge position and serves to brush the potatoes from the riddle on to the base of elevator 34. Riddle 31 is provided with a guard rail 35 the front portion of which is shown broken away in Figure 1 in order to disclose riddle 31 and with another guard 36 at the opposite side of the elevator casing 37 from that at which brush 33 is situated. Brush 33 is rotated in the direction of arrow 138 and consequently while the potatoes travel round towards the brush in an anti-clockwise direction they encounter the bristles of the brush sweeping them off in the direction opposite from that in which they approach the brush. If desired the potatoes may be received on a slightly inclined grid before they enter the elevator 34. Such grid however, is not shown in the accompanying drawings and is merely a transferring platform down which the potatoes will roll to be picked up by the elevator after having passed from riddle 31.

The elevator is also power driven and is mounted in the rear end of carriage 10, the details of support for the elevator 34 are not, however, shown as of themselves they form no part of the present invention and are omitted for the sake of clearness. A frame or gantry 38 is provided in the machine on which can be supported a canvas or other cover 39 when it is rolled up on the gantry during use of the machine, but which can be used to cover the machine when not in use.

Although brush 28, 29, 30 has been shown as the means of stimulating soil separation, this stimulation may be effected by any other preferred agitating means, or there may be more than one brush such as that described situated at different positions around the riddle. In fact the riddle 19 has its whole surface so readily available and accessible that the location of any such means or any other necessary means can be given its or their optimum position or positions.

In the form illustrated there are four main riddling points. The first is at the position at which the lifted potatoes and earth are transported on to the riddle. The second is at the position where the earth and potatoes are operated upon by the brush 28, 29, 30. The third occurs where the potatoes together with any accompanying earth drop on to the second riddle 31, and the fourth occurs where brush 33 tends to sweep the potatoes from riddle 31. If the fixed grid above described as leading to the base of the elevator 34 is provided, this will afford a fifth riddling point. These are the positions at which rapid riddling occurs although throughout the whole of the travel of the soil and potatoes through the machine riddling will be continued to some extent.

In Figure 2 the drive for the various parts is schematically illustrated all the parts being driven by the motor 40. The latter is situated on a carriage in the rear of the machine frame 10, and is connected by belts 41 to a main shaft 42. Pulleys 43 and belts 44 connect main shaft 42 with pulleys 45 mounted on spindle 46 which carries one member 47 of a bevel gear, the other member 48 of which is mounted on spindle 49 carrying two other bevel wheels 50 and 51.

Bevel wheel 50 meshes with a second bevel wheel 52 mounted on shaft 22 by which the main riddle 19 is driven. Bevel wheel 51 meshes with a further bevel wheel 53 mounted on spindle 54 which carries a pulley 55 connected by belt 56 to another pulley 57 carried by spindle 58 on which the second riddle 31 is mounted. Spindle 26 of brush 28, 29, 30 is driven through gearing 59 one member of which is mounted on spindle 60 driven from main shaft 42 by pulleys 61, 62 and belts 63. Spindle 60 is also connected by belt 64 to gearing 65 driving the main spindle 66 of elevator 34. Brush 33 is driven from the spindle 26 by pulleys 67, 68 and 69 and belt 70; pulleys 69 being mounted on spindle 71 on which brush 33 is mounted.

At the forward end of the main shaft 42 a drive is taken by means of pulleys 72, 73 and belt 74 to a spindle 75 by which the elevating gear for the frame 16 is operated. From another pulley 78 on main shaft 42 a belt 76 is taken to pulley 77 on spindle 79 from which a drive is taken by belts 80 from pulleys 81 on spindle 79 to pulleys 82 on a spindle 83 connected by bevel gearing 84 to a haulm stripper indicated at 85 to form per se no part of the present invention. The haulm stripper 85 is represented diagrammatically and is situated at the front of the machine to operate ahead of the plough.

Another belt 86 is taken from a pulley 87 on spindle 79 to a pulley 88 on spindle 89 which serves to drive another brush 90 which, however, for the sake of clearness is not shown in Figure 1. Brush 90 is of cylindrical form rotating about the axis of spindle 89 and sweeps across the surface of the riddle immediately in rear of the plough and slightly to one side so as to agitate the soil for the purpose of cleaning the riddle before further material is passed on to it.

An advantage of the inclined plough is that it makes a longer cut than a straight plough having the same dimension measured at right angles to the line of travel. Also it creates a better breaking up of the soil.

The open bowl-shaped form of riddle not only affords easy access for the application of any devices that may be required but also gives very easy access for cleaning.

The arrangement of the riddle ensures that the lifted and sifted soil falls back on to the line of the lifted ridge instead of to one side of that ridge where it would interfere with subsequent operations on an adjacent ridge.

The mechanism 15, 16 enables the front of the frame and therefore the position of the plough and riddle to be adjusted relatively to the ground surface over which the machine travels. Thus, when required, as at headlands, the plough and riddle can be raised completely clear of the ground.

I claim:

1. A harvesting machine of the type described having a riddle mounted to rotate about an axis that is inclined obliquely to the line of travel of the machine and which is formed as a rotor having a central aperture, an outer marginal portion formed as a riddling surface free from pockets, and an intermediate portion between the central aperture and the riddling surface provided with pockets into which the potatoes can pass from the riddling surface and by which they will be elevated as the riddle rotates.

2. A harvesting machine of the type described in which a riddle is mounted to rotate about an axis that is inclined obliquely to the line of travel of the machine and the said axis itself is disposed in a vertical plane, and in which the riddle is formed as a rotor having a central aperture, an outer marginal annular portion formed as a riddling surface free from pockets, and an intermediate portion between the central aperture and the riddling surface provided with pockets into which the potatoes can pass from the riddling surface and by which they will be elevated as the riddle rotates.

3. A harvesting machine of the type described in which a riddle is mounted to rotate about an axis that is inclined obliquely to the line of travel of the machine and the said axis itself is disposed in a vertical plane which lies obliquely across the aforesaid line of travel, and in which the riddle is formed as a rotor having a central aperture, an outer marginal portion formed as a riddling surface free from pockets, and an intermediate portion between the central aperture and the riddling surface provided with pockets into which the potatoes can pass from the riddling surface and by which they will be elevated as the riddle rotates.

4. A harvesting machine according to claim 3 having a motor, track wheels and a plurality of other power driven moving parts, said motor being mechanically coupled to drive the riddle and said other power driven moving parts.

5. A harvesting machine according to claim 3 in which the riddle is in the form of a shallow cone or bowl.

6. A harvesting machine according to claim 3 combined with a plough arranged in the machine to cut through the potato ridge in order to free it and to enable potatoes to pass in a substantially straight path in to the wider open end of the riddle.

7. A harvesting machine according to claim 3 combined with a plough so arranged in the machine as to cut through the potato ridge in order to free it and to enable potatoes to pass in to the wider open end of the riddle, the plough and riddle being so relatively arranged that the freed material moves on to the surface of the riddle in a substantially tangential direction relatively to the circle of the riddle.

8. A harvesting machine according to claim 3 combined with a plough to cut through the potato ridge in order to free it and to enable potatoes to pass in to the wider open end of the riddle, wherein the leading edge of the plough is straight and is inclined obliquely across the line of travel of the machine.

9. A harvesting machine according to claim 3 combined with a plough to cut through the potato ridge in order to free it, and the leading edge of the plough is of arcuate form so arranged that the chord of the arc is inclined obliquely across the line of travel of the machine.

10. A harvesting machine according to claim 3, combined with a plough arranged in the machine to cut through the potato ridge in order to free it and to enable potatoes to pass into the wider open end of the riddle, in which a plough and the leading edge of the riddle are both normally so positioned that they will lie below the level of the top surface of the soil of the ridge.

11. A harvesting machine according to claim 3, combined with a plurality of angularly spaced fins secured to the interior of the riddle to divide the inner portion at least of the riddle into a plurality of pockets into which the potatoes will travel as they are gradually raised in those pockets by rotation of the riddle.

12. A harvesting machine according to claim 3, combined with a shield extending substantially from the position at which the material is received on the riddle to the position for discharge of the potatoes, said shield being so disposed as to close the escape of potatoes from the open inner end of the riddle between the two portions just referred to.

13. A harvesting machine according to claim 3, combined with a power driven elevator to remove potatoes which have been discharged from the riddle.

14. A harvesting machine according to claim 3, having in combination power driven agitating means situated close to the position at which lifted material is deposited on the riddle and positioned to agitate the material so deposited to stimulate the separation of earth from potatoes.

15. A harvesting machine according to claim 3, having in combination power driven agitating means in the form of a rotary brush which is situated close to the position at which lifted material is deposited on to the riddle and at a position to agitate the material so deposited for the purpose of stimulating the separation of earth from potatoes.

16. A harvesting machine according to claim 3, having in combination power driven agitating means in the form of a rotary brush which is situated close to the position at which lifted material is deposited on to the riddle and which is arranged with its axis substantially tangential to the circle of the riddle to engage the lifted material and to agitate it in order to stimulate the separation of earth from potatoes.

17. A harvesting machine according to claim 3, having in combination power driven agitating means situated close to the position at which lifted material is deposited on to the riddle and positioned to agitate the material so deposited to stimulate the separation of earth from potatoes and having also at least one additional agitating means operating at a position removed from the first named agitating means and serving to stimulate further separation of soil from potatoes.

18. A harvesting machine according to claim 3, having in combination power driven agitating means in the form of a rotary brush situated close to the position at which lifted material is deposited on to the riddle and serving to agitate the material so deposited to stimulate the separation of earth from potatoes and at least one additional agitating means also in the form of a brush operating at a position removed from the first agitating means for further stimulating separation of soil from potatoes on the main riddle.

19. A harvesting machine according to claim 3 having a second rotary riddle so situated as to receive potatoes discharged from the main riddle, said additional agitating means being situated immediately in rear of the plough and slightly to one side so as to clean the riddle before further material is passed on to it from the plough.

20. A harvesting machine according to claim 3, having a second rotary riddle so situated as to receive potatoes discharged from the main riddle.

21. A harvesting machine according to claim 3, combined with a second rotary riddle which rotates about a substantially vertical axis and is so situated to receive potatoes discharged from the main riddle and serves not only to assist in screening the potatoes, but also as a transporter for them.

22. A harvesting machine according to claim 3, combined with a second rotary riddle so situated as to receive potatoes discharged from the main riddle, and a rotary power driven brush to sweep across a portion of the surface of the second riddle at the discharged position in order to brush potatoes from the riddle.

23. A harvesting machine according to claim 3, having a second rotary riddle so situated as to receive potatoes discharged from the main riddle in combination with a receiver for the potatoes discharged from the second riddle, and a travelling conveyor to remove potatoes from the receiver.

24. A harvesting machine according to claim 3, having a second rotary riddle so situated as to receive potatoes discharged from the main riddle, in combination with a receiver into which potatoes are discharged from the said second riddle and a travelling elevator conveyor by which potatoes are raised from the receiver and by which they are discharged laterally from the machine.

25. The combination with the subject matter of claim 3, of a haulm stripper situated at the front of the machine to operate ahead of the plough.

26. The subject matter of claim 3, combined with means to adjust the position of the plough and riddle relatively to the ground surface over which the machine travels.

27. The subject matter of claim 3, combined with means to adjust the position of the plough and riddle relatively to the ground surface over which the machine travels in which the adjusting means is such as to enable the plough and the riddle to be raised clear of the ground when desired.

PERCIVAL JAMES PACKMAN.

REFERENCES CITED

The following references are of record in the file of this patent:

UNITED STATES PATENTS

| Number | Name | Date |
|---|---|---|
| 383,488 | Perry | May 29, 1888 |
| 896,109 | Henke | Aug. 18, 1908 |
| 1,378,427 | Slathar | May 17, 1921 |

FOREIGN PATENTS

| Number | Country | Date |
|---|---|---|
| 4,278 | Austria | May 25, 1901 |
| 43,326 | Germany | May 25, 1888 |
| 73,643 | Germany | Mar. 6, 1894 |
| 318,638 | Germany | Feb. 4, 1920 |